United States Patent
Ionin et al.

(10) Patent No.: US 12,417,027 B2
(45) Date of Patent: Sep. 16, 2025

(54) OPTIMIZING USAGE OF MULTIPLE WRITE PATHS ON MULTI-TENANT STORAGE DEVICES

(71) Applicant: SANDISK TECHNOLOGIES, INC., Milpitas, CA (US)

(72) Inventors: Michael Ionin, Rehovot (IL); Alexander Bazarsky, Holon (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/420,014

(22) Filed: Jan. 23, 2024

(65) Prior Publication Data

US 2025/0238139 A1    Jul. 24, 2025

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ........ G06F 3/06; G06F 3/0659; G06F 3/0653; G06G 3/0613
See application file for complete search history.

(56) References Cited

U.S. PATENT DOCUMENTS

| | | | |
|---|---|---|---|
| 8,521,922 B2 | 8/2013 | Haustein et al. | |
| 9,626,116 B1 * | 4/2017 | Martin | G06F 11/14 |
| 10,389,380 B2 | 8/2019 | Yuan et al. | |
| 10,564,872 B2 | 2/2020 | Benisty | |
| 11,275,509 B1 * | 3/2022 | Colgrove | G06F 11/1076 |
| 11,614,880 B2 | 3/2023 | Gao et al. | |
| 12,175,119 B2 * | 12/2024 | Hahn | G06F 13/4022 |
| 2021/0255971 A1 * | 8/2021 | Kim | G06F 3/0659 |
| 2022/0269434 A1 * | 8/2022 | Shin | G06F 3/0631 |
| 2022/0357891 A1 * | 11/2022 | Wang | G06F 11/108 |
| 2023/0140773 A1 * | 5/2023 | Raju | G06F 3/064 <br> 711/154 |
| 2023/0143926 A1 | 5/2023 | Inbar et al. | |

(Continued)

FOREIGN PATENT DOCUMENTS

EP    3869318 A1 *  8/2021    ........... G06F 3/0679

*Primary Examiner* — Pierre Michel Bataille
(74) *Attorney, Agent, or Firm* — Patterson + Sheridan, LLP

(57) ABSTRACT

Instead of ignoring workflow or priority of tenant, modify the write path according to the tenant behavior and system priority using the multi-tenant storage device. When writing information, the write path usually includes RAM memory where the host or device copies the data. The data is copied to the NVM storage element. The RAM memory may be either part of the storage controller (either SRAM or DRAM) or part of the host (like DRAM in HMB) that may be controlled by the storage controller. The RAM memories are used for different goals by the storage controller and optimizing the overall system performance (write/read) is a priority of the storage device. In multi-tenant architectures, the different tenants may have different priorities to have their requirements fulfilled. The tenant priority is passed by the host to the storage device through an interface and either be static or change dynamically during the device operation. Optimizing the write paths according to tenant workload and priority may be done by a module in the storage controller.

17 Claims, 7 Drawing Sheets

(56) References Cited

U.S. PATENT DOCUMENTS

| | | | |
|---|---|---|---|
| 2024/0004561 A1* | 1/2024 | Benisty | G06F 3/0617 |
| 2024/0086071 A1* | 3/2024 | Gorrle | G06F 3/0611 |
| 2024/0272946 A1* | 8/2024 | Bahirat | G06F 9/5033 |
| 2024/0354256 A1* | 10/2024 | Gold | G06F 12/0875 |

* cited by examiner

_OPTIMIZING USAGE OF MULTIPLE WRITE PATHS ON MULTI-TENANT STORAGE DEVICES_

BACKGROUND OF THE DISCLOSURE

Field of the Disclosure

Embodiments of the present disclosure generally relate to increasing storage device performance through system priority recognition.

Description of the Related Art

The main idea of multi-tenant storage architecture is to allow the allocation of storage resources to several independent tenants with the assurance that one tenant cannot access resources associated with another tenant.

Storage devices in a multi-tenant architecture expected to serve multiple tenants have their configuration set up accordingly. Each tenant has their own distinct properties, which are not shared across all the tenants. A specific example of multi-tenancy that is used in automotive devices is the single root input/output (I/O) virtualization (SR-IOV) interface.

The SR-IOV interface is an extension to the Peripheral Component Interconnect Express (PCIe) specification. SR-IOV allows a device, such as a network adapter, to separate access to the resources among various PCIe hardware functions. The SR-IOV allows a PCIe device to appear to be multiple PCIe devices. The SR-IOV introduces the concepts of physical functions (PF) and virtual functions (VF). The PF has full featured PCIe functions, while the VF has light weight functions that lack configuration resources.

It is contemplated that the write path of a device could be defined without regard to the workflow or priority of tenant. There might also be different write paths for different devices that are optimized for different goals and customers. However, the work flows are still challenging to optimize.

There is a need in the art for optimizing the write paths according to workloads.

SUMMARY OF THE DISCLOSURE

Instead of ignoring workflow or priority of tenant, modify the write path according to the tenant behavior and system priority using the multi-tenant storage device. When writing information, the write path usually includes random access memory (RAM) memory where the host or device copies the data. The data is copied to the non-volatile memory (NVM) storage element. The RAM memory may be either part of the storage controller (either static RAM (SRAM) or dynamic RAM (DRAM)) or part of the host (like DRAM in host memory buffer (HMB)) that may be controlled by the storage controller. The RAM memory is used for different goals set by the storage controller and optimizes the overall system performance when write or read commands are the priority of the storage device. In multi-tenant architectures, the different tenants may have different priorities to have their requirements fulfilled. The tenant priority is passed by the host to the storage device through an interface and is either changed statically or dynamically during the device operation. Optimizing the write paths according to tenant workload and priority may be done by a module in the storage controller.

In one embodiment, a data storage device comprises: a memory device, and a controller coupled to the memory device, wherein the controller, a first volatile memory and a second volatile memory distinct from the first volatile memory, wherein the controller is configured to: direct data for a first write command to the first volatile memory; determine that tenant behavior or system priority has changed; and direct data for a second write command to the second volatile memory.

In another embodiment, a data storage device comprises: a memory device; and a controller coupled to the memory device, wherein the controller is configured to: route a first command through dynamic random access memory (DRAM), wherein the first command is from a first tenant; route a second command through static random access memory (SRAM), wherein the second command is from a second tenant distinct from the first tenant; change priority for one or more of the first tenant and the second tenant; and route a third command through the SRAM, wherein the third command is from a third tenant distinct from the first tenant and the second tenant.

In another embodiment, a data storage device comprises: means to store data; and a controller coupled to the means to store data, wherein the controller is configured to: route data associated with a first command through host memory buffer (HMB) and the means to store data; and route data associated with a second command through a static random access memory (SRAM) and the means to store data, wherein the data storage device is dynamic random access memory (DRAM) less.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of ignoring workflow or priority of tenant, modify the write path according to the tenant behavior and system priority using the multi-tenant storage device. When writing information, the write path usually includes RAM memory where the host or device copies the data. The data is copied to the NVM storage element. The RAM memory may be either part of the storage controller (either SRAM or DRAM) or part of the host (like DRAM in HMB) that may be controlled by the storage controller. The RAM memory is used for different goals set by the storage controller and optimizes the overall system performance when write or read commands are the priority of the storage device. In multi-tenant architectures, the different tenants may have different priorities to have their requirements fulfilled. Tenant priority is passed by the host to the storage device through an interface and is either changed statically or dynamically during the device operation. Optimizing the write paths according to tenant workload and priority may be done by a module in the storage controller.

Figure 1:
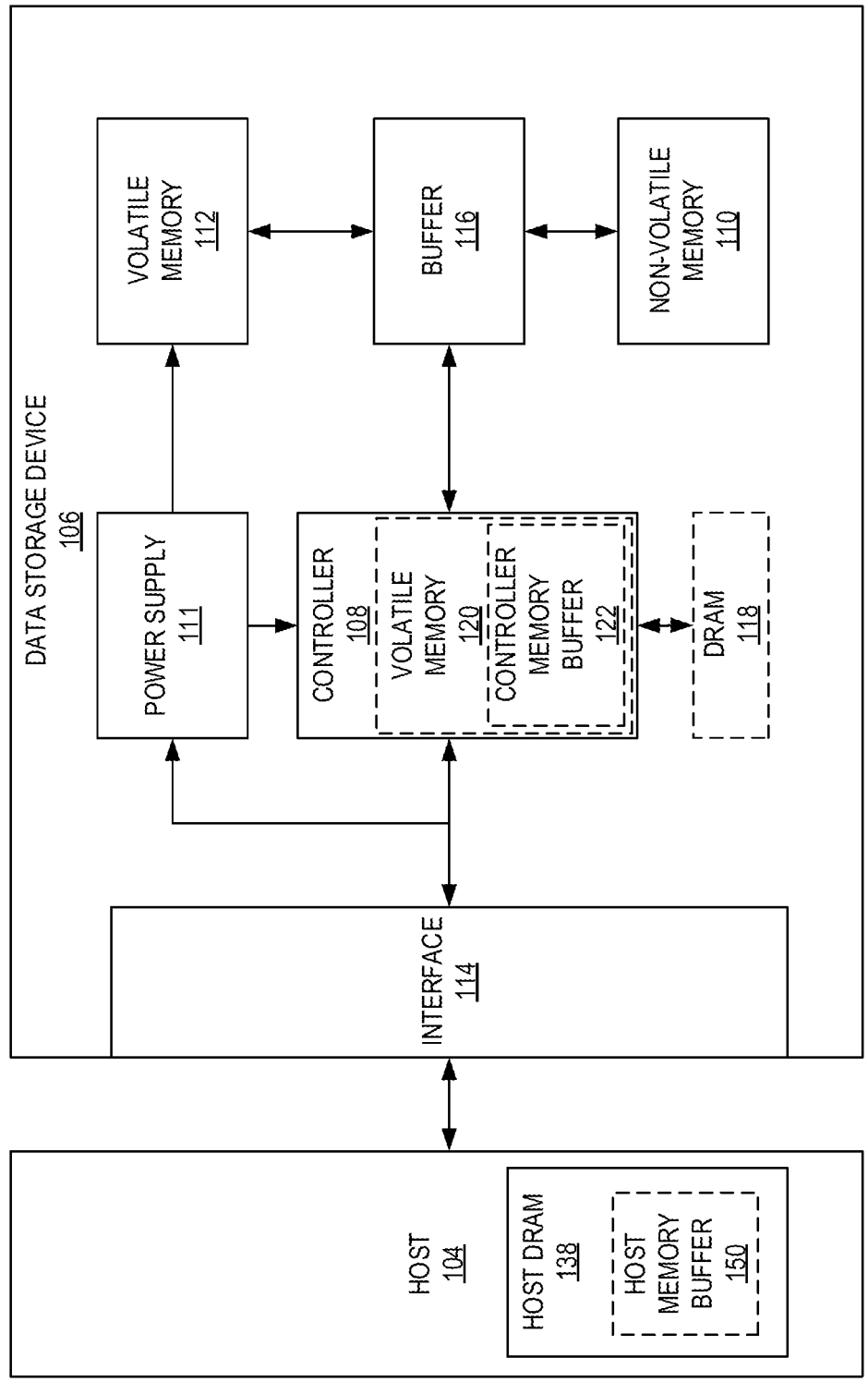
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. It is contemplated that the volatile memory 112 and the DRAM 118 may, in some embodiments, be one in the same. However, it is contemplated that the volatile memory 112 and the DRAM 118 may in fact be different volatile memories with the DRAM 118 being a specific type of volatile memory. As will be discussed below, a second volatile memory 120, which may be SRAM, could also be one in the same with the write buffer 116. However, it is contemplated that there could be distinct DRAM, SRAM, and write buffer. In other words, it is contemplated that there may be multiple distinct volatile memories. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: PCIe, non-volatile memory express (NVMe), OpenCAPI, GenZ, Cache Coherent Interface Accelerator (CCIX), Open Channel SSD (OCSSD), Compute Express Link (CXL), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
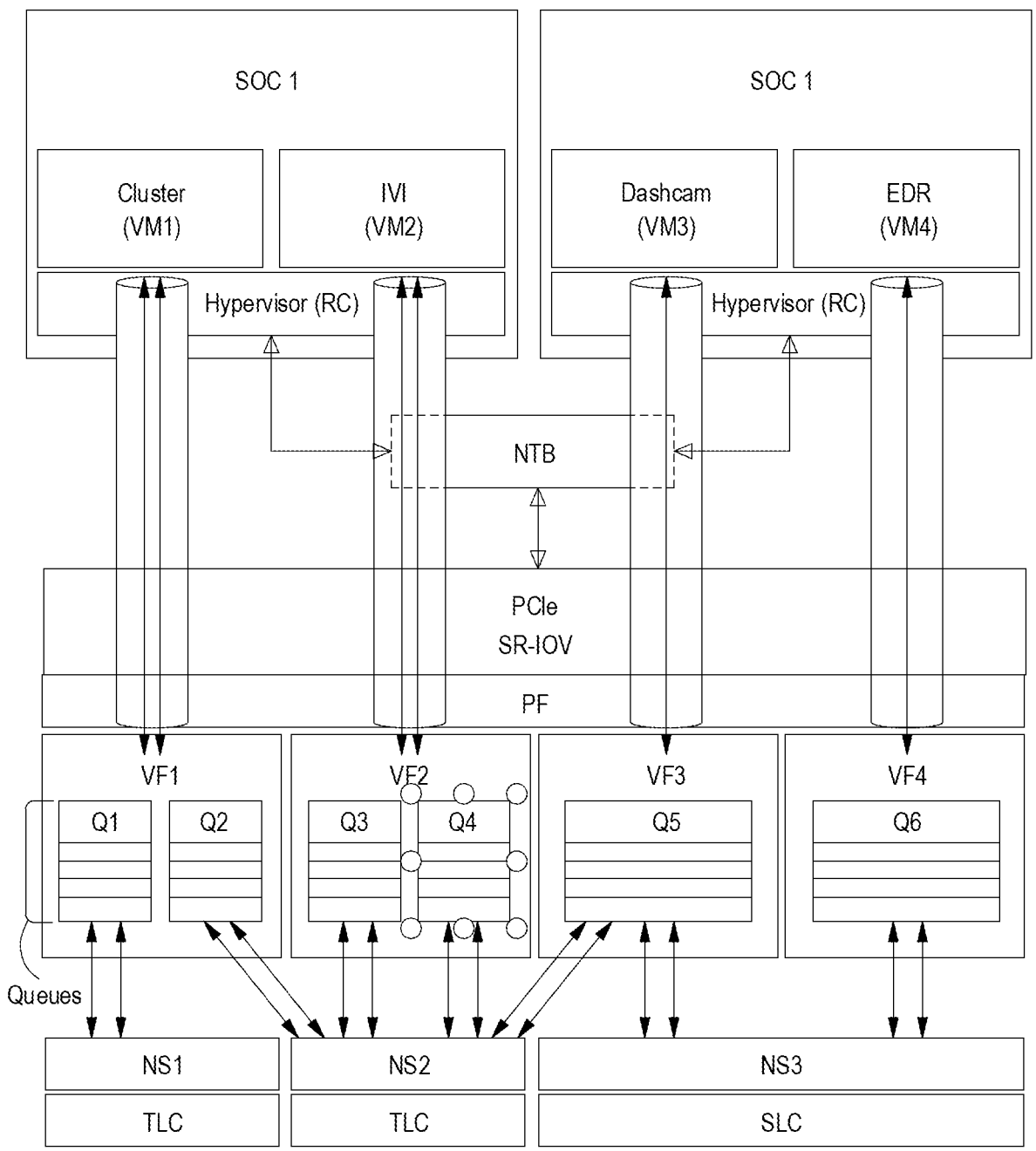
FIG. 2 is a block diagram illustrating a SR-IOV system, according to certain embodiments.

FIG. 2 is a block diagram illustrating a SR-IOV system 200, according to certain embodiments. When writing information, the write path usually includes RAM memory where the host or device copies the data. Then, the copied data is copied to the NVM storage element. In multi-tenant architectures, the different tenants may have different priorities to have requirements fulfilled. For example, the logging system may write occasionally, but the data is extremely important and is to be written immediately. Another system may be writing intensively, but the data may be of lower priority and the writes may be halted once other commands come to the storage device.

In certain workloads, a pre-defined path for the data may be detrimental to the SR-IOV system 200 performance, and in this invention we aim to improve this performance when encountering different priority tenants with different workloads in a single automotive storage device. The SR-IOV system 200 comprises a silicon on chip (SOC) 1 and a SOC 2. The SOC 1 comprises a cluster which is a first virtual machine, an example of in vehicle infotainment (IVI) which is a second virtual machine, and a hypervisor. The SOC 2 comprises a dashcam which is a third virtual machine, an endpoint detection response (EDR) which is a fourth virtual machine, and a hypervisor. Each of the hypervisors of the SOC 1 and the SOC 2 are in commutation with the Non Transparent Bridge (NTB). The NTB is in communication with the PCIe SR-IOV, connecting the memory systems. The SR-IOV system 200 further comprises a PF and a plurality of VFs with each comprising a plurality queues. The VF1 is in communication with the cluster. The VF2 is in communication with the IVI. The VF3 is in communication with the dashcam. The VF4 is in communication with the EDR. Each of the queues are in communication with a namespace (NS) of a plurality of NSs with each NS being in communication with either triple level cell (TLC) or single level cell (SLC) memory. It is to be understood that other memory is possible such as quad level cell (QLC) or multilevel cell (MLC).

As will be discussed herein, modifying the write path according to tenant behavior and system priority using the multi-tenant storage device is proposed. When writing information, the write path usually includes RAM where the host device or data storage device copies the data. Then, the data is copied to the NVM storage element. The RAM may be either part of the controller (either SRAM or DRAM) or part of the host itself (e.g., HMB) that may be controller by the controller. RAM is used for different goals by the controller and optimizing the overall system performance (i.e., write/read) is a priority of the data storage device.

In multi-tenant architectures, the different tenants may have different priorities to have the individual tenant requirements fulfilled. The system discussed herein would also consider the priority of the tenant when optimizing the write paths according to workloads. The priority may be passed by the host device to the data storage device through an interface and either be static or change dynamically during the data storage device operation.

Figure 3:
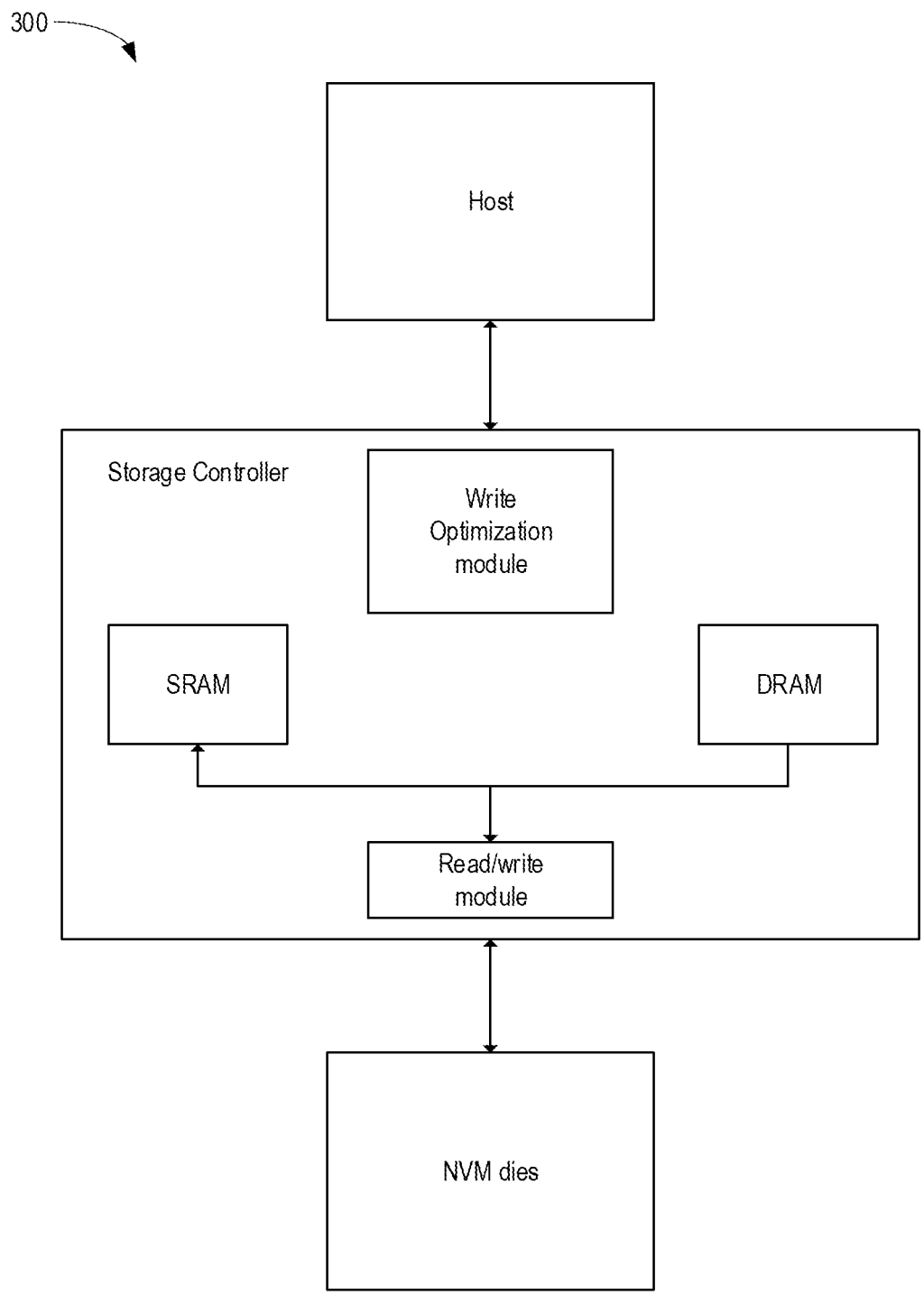
FIG. 3 is a block diagram illustrating a system for write optimization from DRAM to NVM, according to certain embodiments.

FIG. 3 is a block diagram illustrating a system 300 for write optimization from DRAM to NVM, according to certain embodiments. The system 300 comprises a host, a storage controller, and NVM dies. The storage controller comprises a write optimization module, an SRAM, a DRAM, and a read/write module. The regular write path would use the SRAM as its intermediate media, but in certain workloads and tenant priorities, the write data would be copied to the DRAM, and then in a later time to the NVM dies. In appropriate workloads, such an optimization would allow maintaining a high read rate using the SRAM for one prioritized tenant, while containing the write using the DRAM for another tenant of lower priority and not stalling the host with this respect.

The data is coming from the host and the write optimization module will determine whether to use the SRAM or the DRAM. The write will then be achieved either from the SRAM or the DRAM at some point later in time. For example when there is some bandwidth available the write data will be programmed from the DRAM to the NVM dies. The optimization also allows using the SRAM for a high performance of the read. If high performance read priority is detected, writes are kept in the DRAM as a lower priority to write, not to affect the high performance read priority.

Figure 4:
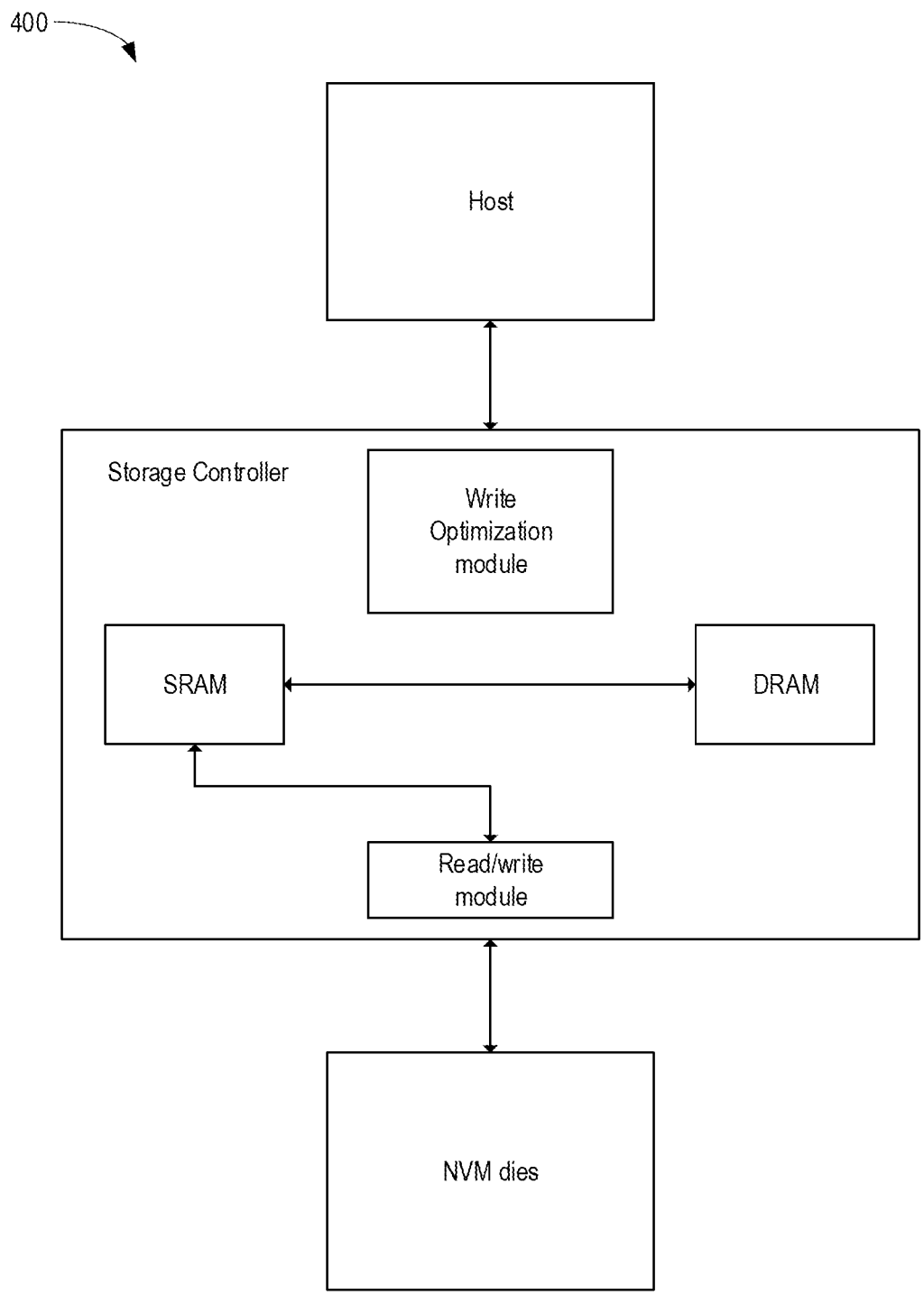
FIG. 4 is a block diagram illustrating a system for write optimization from DRAM to SRAM, according to certain embodiments.

FIG. 4 is a block diagram illustrating a system 400 for write optimization from DRAM to SRAM, according to certain embodiments. The system 400 comprises a host, a storage controller, and NVM dies. The storage controller comprises a write optimization module, an SRAM, a DRAM, and a read/write module. Write optimization is relevant for devices where one (or more) of the tenants in a multi-tenant system is a read intensive tenant with a certain high priority, while another tenant of potentially lower priority is writing at a fixed speed that is relatively low, such as an EDR tenant. In this case, one (or more) of the tenants may be using the device SRAM for read, while the other tenants are using the DRAM for writes, later copying to NVM.

The system 400 is used when data is mostly read, but a log file write is passed when some time elapses or some operation is performed. This is a short write without performance requirements (which also wouldn't have strict power loss protection (PLP) requirement, and so data doesn't have to be written immediately). The log file doesn't necessarily require to have an exact data integrity, which means that the host can allow the data to be lost in case of power loss. The data will be written eventually to the NAND as long as there is no power loss, but yet the system 400 will give the host the maximum read performance.

In another embodiment, the write path may include an option to contain the data in DRAM temporarily, but later copying to the NVM through the SRAM. This is more compatible to architectures that don't involve direct write from DRAM to NVM due to the ASIC structure. There is no functional constraints to the architecture, though there is need to have available SRAM space for the write, which may involve specific timing of the write process. The host will send the write to the controller, the write optimization module will decide whether to route the write to the SRAM or to the DRAM. If the write is routed to the DRAM, then later in time the controller will program from the DRAM through the SRAM to the NAND.

Figure 5:
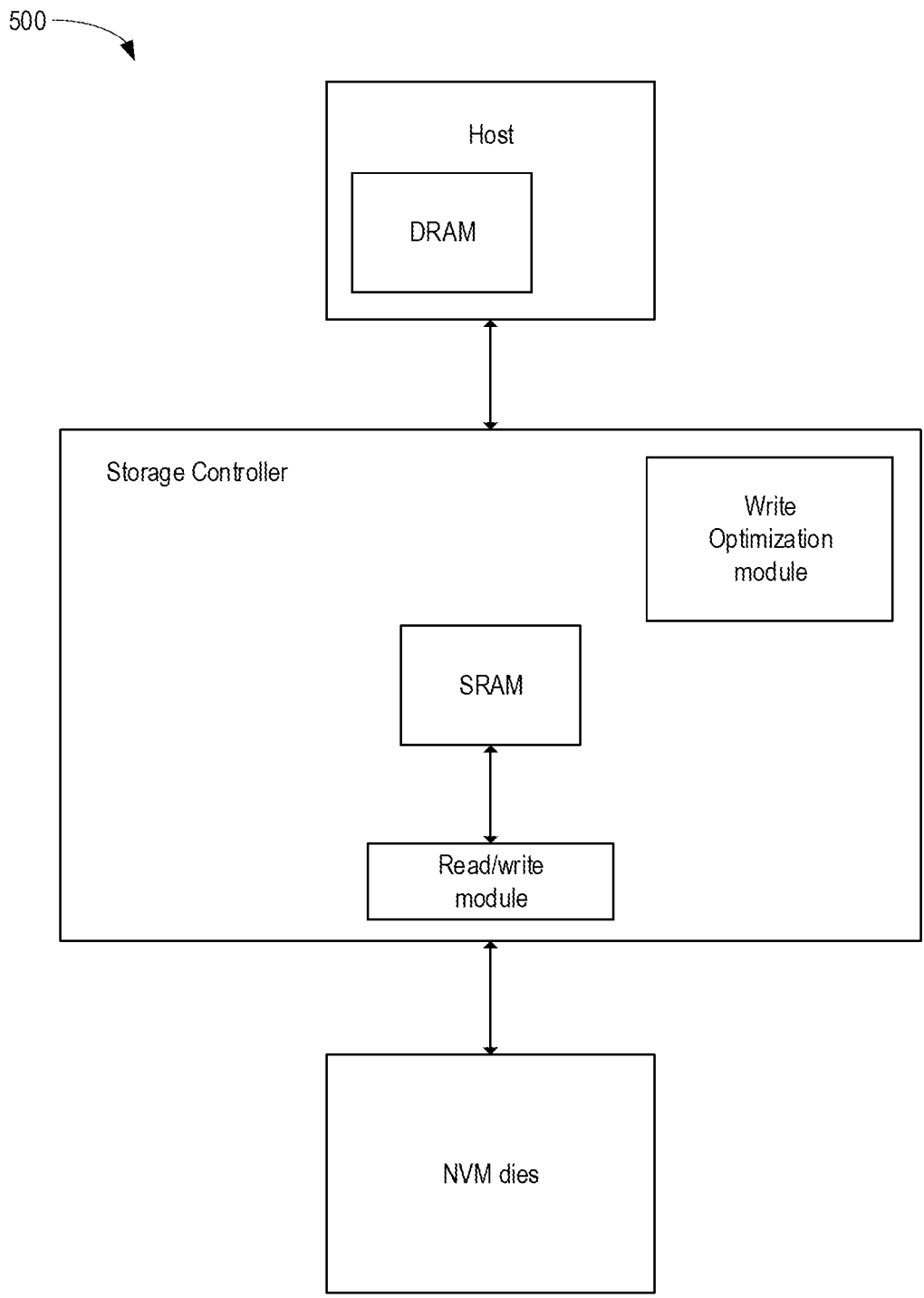
FIG. 5 is a block diagram illustrating a system for write optimization with optional HMB, according to certain embodiments.

FIG. 5 is a block diagram illustrating a system 500 for write optimization with optional HMB, according to certain embodiments. The system 500 comprises a host, a storage controller, and NVM dies. The host comprises a DRAM, while the storage controller comprises a write optimization module, an SRAM, and a read/write module. The DRAM may be located on the host device as a part of the HMB. Once the write optimization module decides on using the HMB as part of the write path, the data will be copied to the HMB by the device. Then, the data will be pulled into the device at a later point to be written to the NVM. This may be suitable for use cases that don't use PLP.

Figure 6:
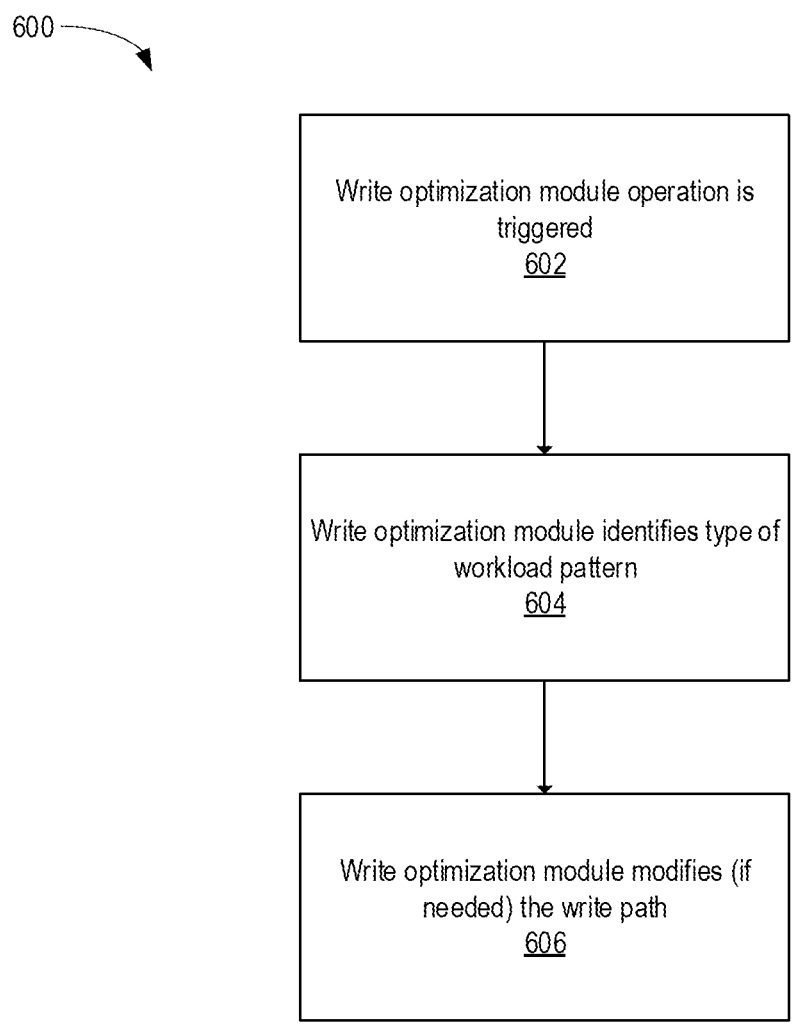
FIG. 6 is a flowchart illustrating a method for write optimization, according to certain embodiments.

FIG. 6 is a flowchart illustrating a method 600 for write optimization, according to certain embodiments. The method 600 begins at block 602. At block 602, the write optimization module operation is triggered. At block 604, the write optimization module identifies type of workload pattern. At block 606, the write optimization module modifies (if needed) the write path.

When the write optimization module identifies a suitable case, the SRAM may be temporarily divided between the read purpose and the write purpose space. This is especially useful for storage devices that use a read look ahead (RLA) mechanism that does not utilize a DRAM. RLA is used in sequential read workloads to read data before the host data actually requests the data.

Prior to the current disclosure, when encountering write operation within a sequential read workload, such an application would stall and discard the RLA data. However, the write may be a small file and the sequential read process would continue afterwards. In this case, the write optimization module would instruct the SRAM to dedicate a small part to the write operation, but not harm the RLA (except the small RAM part that is unavailable). Thus, the read performance is not harmed (or only slightly impaired).

The operation of the write optimization module is triggered by one of the potential following triggers or a combination of performance impact identified, priority of tenants changed by host, a new random write command sent by host (may have some overhead to operate on each write command, but only filtering some of the write commands may be ok), and time elapsed. The write optimization module would identify the type of used workload by comparing patterns of known workloads. Some LBA range may be involved that is pre-defined for system operations such as log writes.

Figure 7:
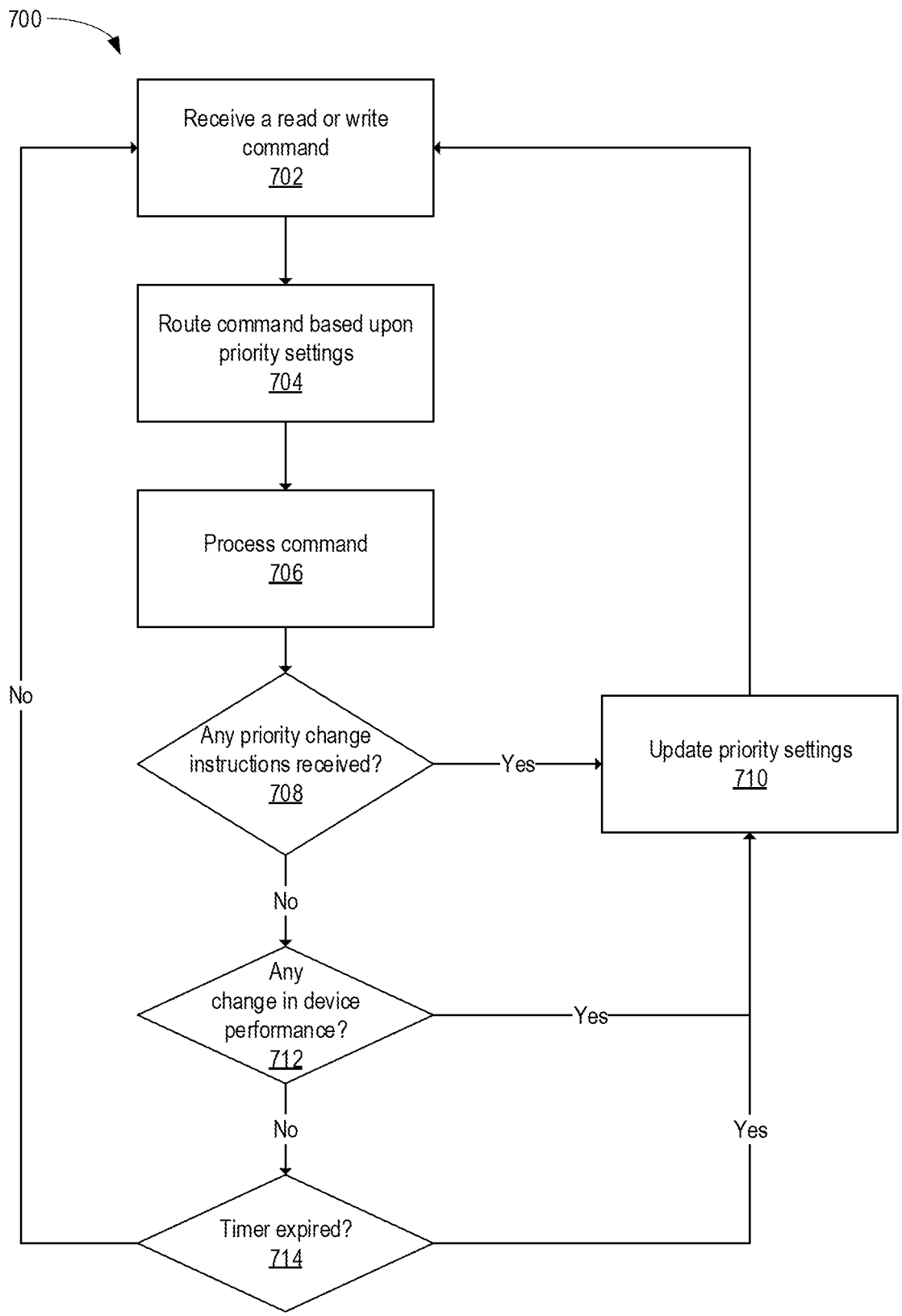
FIG. 7 is a flowchart illustrating a method for system priority recognition, according to certain embodiments.

FIG. 7 is a flowchart illustrating a method 700 for system priority recognition, according to certain embodiments. The method 700 begins at block 702. At block 702, the controller receives a read or write command. At block 704, the controller routes the command based upon priority settings. At block 706, the controller processes the command. At block 708, the controller determines whether any priority change instructions are received. If the controller determines instructions are received, then the method 700 proceeds to block 710. At block 710, the controller updates the priority settings. If the controller determines that instructions are not received, then the method 700 proceeds to block 712. At block 712, the controller determines whether there is any change in the device performance. If the controller determines that there is a change in the device performance, then the method 700 returns to block 710. If the controller determines that there is no change in the device performance, then the method 700 proceeds to block 714. At block 714, the controller determines whether a timer has expired. If the controller determines that the timer has expired, then the method 700 proceeds to block 710. If the controller determines that the timer has not expired, then the method 700 returns to block 702. It is to be understood that blocks 708, 712, 714 can be performed in any order.

System priority recognition will improve the read throughput of storage devices based on multi-tenants with different workloads and different host priorities.

In one embodiment, a data storage device comprises: a memory device, and a controller coupled to the memory device, wherein the controller a first volatile memory and a second volatile memory distinct from the first volatile memory, wherein the controller is configured to: direct data for a first write command to the first volatile memory; determine that tenant behavior or system priority has changed; and direct data for a second write command to the second volatile memory. The first volatile memory is static random access memory (SRAM) and the second volatile memory is dynamic random access memory (DRAM). The controller is further configured to direct the data for the second write command to the first volatile memory after the direction to the second volatile memory. The second volatile memory is host memory buffer (HMB) and the first volatile memory is either: static random access memory (SRAM); or the second volatile memory is dynamic random access memory (DRAM). The determining comprises receiving priority change information. The determining comprises detecting a change in performance. The determining comprises determining a timer has expired. The data storage device is a multi-tenant data storage device. The determining comprises receiving a random write command from a first tenant. The multi-tenant data storage device comprises a first tenant that is a read intensive tenant and a second tenant that is a write intensive tenant, and wherein the first write command and the second write command are from the second tenant.

In another embodiment, a data storage device comprises: a memory device; and a controller coupled to the memory device, wherein the controller is configured to: route a first command through dynamic random access memory (DRAM), wherein the first command is from a first tenant; route a second command through static random access memory (SRAM), wherein the second command is from a second tenant distinct from the first tenant; change priority for one or more of the first tenant and the second tenant; and route a third command through the SRAM, wherein the third command is from a third tenant distinct from the first tenant and the second tenant. The first command is a write command, the second command is a read command, and the third command is a read command. The changing priority comprises changing the priority of the second tenant. Changing priority comprises changing routing of commands for the second tenant to route through the DRAM or host memory buffer (HMB). The changing is performed dynamically during device operation. The SRAM is divided between read operations for the second tenant and write operations for the third tenant. Data routed through the DRAM is routed through the DRAM and then the SRAM and then to the memory device.

In another embodiment, a data storage device comprises: means to store data; and a controller coupled to the means to store data, wherein the controller is configured to: route data associated with a first command through host memory buffer (HMB) and the means to store data; and route data associated with a second command through a static random access memory (SRAM) and the means to store data, wherein the data storage device is dynamic random access memory (DRAM) less. The controller is configured to utilize a read look ahead (RLA) mechanism. The controller is configured to dedicate a first portion of the SRAM for write operations and a second portion for RLA operations.

While the foregoing is directed to embodiments of the present disclosure, other and further embodiments of the disclosure may be devised without departing from the basic scope thereof, and the scope thereof is determined by the claims that follow.

What is claimed is:

1. A multi-tenant data storage device, comprising:
a memory device; and
a controller coupled to the memory device, wherein the controller is coupled to a first volatile memory and a second volatile memory distinct from the first volatile memory, wherein the controller is configured to:
  direct data for a first write command to the first volatile memory;
  determine that tenant behavior or system priority has changed; and
  direct data for a second write command to the second volatile memory,
wherein the multi-tenant data storage device comprises a first tenant that is a read intensive tenant and a second tenant that is a write intensive tenant, and wherein the first write command and the second write command are from the second tenant.

2. The multi-tenant data storage device of claim 1, wherein the first volatile memory is static random access memory (SRAM) and the second volatile memory is dynamic random access memory (DRAM).

3. The multi-tenant data storage device of claim 1, wherein the controller is further configured to direct the data for the second write command to the first volatile memory after the direction to the second volatile memory.

4. The multi-tenant data storage device of claim 1, wherein the second volatile memory is host memory buffer (HMB) and the first volatile memory is either:
  static random access memory (SRAM); or the second volatile memory is dynamic random access memory (DRAM).

5. The multi-tenant data storage device of claim 1, wherein the determining comprises receiving priority change information.

6. The multi-tenant data storage device of claim 1, wherein the determining comprises detecting a change in performance.

7. The multi-tenant data storage device of claim 1, wherein the determining comprises determining a timer has expired.

8. The multi-tenant data storage device of claim 1, wherein the determining comprises receiving a random write command from a first tenant.

9. A data storage device, comprising:
a memory device; and
a controller coupled to the memory device, wherein the controller is configured to:
route a first command through dynamic random access memory (DRAM), wherein the first command is from a first tenant;
route a second command through static random access memory (SRAM), wherein the second command is from a second tenant distinct from the first tenant;
change priority for one or more of the first tenant and the second tenant; and
route a third command through the SRAM, wherein the third command is from a third tenant distinct from the first tenant and the second tenant, wherein the first command is a write command, the second command is a read command, and the third command is a read command.

10. The data storage device of claim 9, wherein the changing priority comprises changing the priority of the second tenant.

11. The data storage device of claim 10, wherein the changing priority comprises changing routing of commands for the second tenant to route through the DRAM or host memory buffer (HMB).

12. The data storage device of claim 9, wherein the changing priority is performed dynamically during device operation.

13. The data storage device of claim 9, wherein the SRAM is divided between read operations for the second tenant and write operations for the third tenant.

14. The data storage device of claim 9, wherein data routed through the DRAM is routed through the DRAM and then the SRAM and then to the memory device.

15. A multi-tenant data storage device, comprising:
means to store data; and
a controller coupled to the means to store data, wherein the controller is configured to:
route data associated with a first command through host memory buffer (HMB) and the means to store data;
determine that a priority has changed; and
route data associated with a second command through a static random access memory (SRAM) and the means to store data, wherein the data storage device is dynamic random access memory (DRAM) less,
wherein the multi-tenant data storage device comprises a first tenant that is a read intensive tenant and a second tenant that is a write intensive tenant, and wherein the first command and the second command are from the second tenant.

16. The multi-tenant data storage device of claim 15, wherein the controller is configured to utilize a read look ahead (RLA) mechanism.

17. The multi-tenant data storage device of claim 16, wherein the controller is configured to dedicate a first portion of the SRAM for write operations and a second portion for RLA operations.

* * * * *